United States Patent [19]
Scragg et al.

[11] 3,989,928
[45] Nov. 2, 1976

[54] METHOD AND APPARATUS FOR CYCLICALLY CONTROLLING THE ENERGIZATION OF HOME WATER HEATERS

[76] Inventors: Robert L. Scragg; Alfred B. Parker, both of 2937 SW. 27th Ave., Miami, Fla. 33133

[22] Filed: Apr. 1, 1975

[21] Appl. No.: 564,089

[52] U.S. Cl. ................................ 219/334; 219/492; 219/493; 236/46 E; 236/46 R
[51] Int. Cl.² .......................................... F24H 1/00
[58] Field of Search ........... 219/329, 334, 492, 493; 236/46 E, 46 R

[56] References Cited
UNITED STATES PATENTS

| | | | |
|---|---|---|---|
| 2,266,246 | 12/1941 | Osterheld | 219/334 X |
| 2,266,248 | 12/1941 | Osterheld | 219/329 |
| 2,660,657 | 11/1953 | Ostrander | 219/329 |

Primary Examiner—C. L. Albritton
Attorney, Agent, or Firm—Cushman, Darby & Cushman

[57] ABSTRACT

A method and apparatus for cyclically controlling the energization of water heaters in residential homes on a daily and seasonal temperature basis. The apparatus includes a pair of clock timers each having a disk for supporting a plurality of relay actuators in spaced relationship to one another. The relay actuators open and close associated relays which couple power from a suitable source to the water heater via a seasonal thermostatic switch. The thermostatic switch connects one or the other of the relays in circuit with the water heater. On one of the disks the actuators are spaced for "summer" load conditions so that power to the water heater is inhibited for a substantial portion of the time in each day when "summer" power demand is greatest, that is, between noon and 8:00 p.m. On the other disk the actuators are spaced for "winter" load conditions so that power to the water heater is inhibited for a substantial portion of the time when "winter" power demand is greatest, that is, between 4:30 and 9:30 p.m.

6 Claims, 2 Drawing Figures

METHOD AND APPARATUS FOR CYCLICALLY CONTROLLING THE ENERGIZATION OF HOME WATER HEATERS

BACKGROUND OF THE INVENTION

This invention relates to a method and apparatus for cyclically controlling the energization of water heaters on a daily and seasonal temperature basis to thereby reduce peak power demand on electrical utilities.

Electrical utilities generate electric power in three primary modes, that is, a base load, a mid-range load and a peak load. Characteristically, the base load is generated by nuclear power, large oil, coal and/or gas fired units. The present day cost of fuel averages about two mills per kilowatt for nuclear power, 11 mils per kilowatt for large base load oil, coal and gas units, 19 mills per kilowatt for mid-range oil, coal and gas units, and 22 mills per kilowatt for peak load gas turbine generators. Typically, base load generators are kept in continuous operation except for short maintenance intervals throughout the year. Mid-range units have their boilers fired on a continuous basis but the generators are on line when required. Peak power turbines are fired up only when necessary to meet peak load demands. Statistically, base load units now in service are capable of supplying 54% of power generated over 85% of the load demand cycle; while mid-range units are capable of supplying 25% of power generated over 25% of the load demand cycle and peaking units supply 21% of the power generated for a relatively short peak load demand interval which lasts approximately 8% of a daily load demand cycle. In a typical load pattern for a composite utility, i.e., a utility having a load demand characteristic which is the average of all utilities located throughout the country, the base load units carry the total load from midnight to 8:00 a.m., while auxiliary mid-range units typically must operate from 8:00 a.m. to midnight to provide additional required power and peaking units are typically operated from 12:00 noon to 9:30 p.m. to provide peak power as required. The use of these electricity generators for each separate utility will, of course, vary depending upon the locality of the utility and the method of power generation therein. It, however, does become obvious at this point that large utilities would prefer to generate as much power as possible by nuclear units and as little as possible by oil, gas or coal fired units because of the substantial difference in expense per kilowatt hour. However, only 5% of the nation's energy is presently generated by nuclear power and extended use of nuclear power is now in jeopardy due to malfunctions in nuclear plants now existing and because of environmental concerns. It therefore is likely that oil, coal and gas will remain the major source of generated electric power for at least another fifteen years. This means that electrical utility companies are going to continue to have great difficulty in providing relatively inexpensive electricity in the manner which they have been in the past. The continuous increase in the cost and the diminishing available quantities of fossil fuels taken together with the inability of using nuclear power plants on a continuous basis and the difficulty of building such nuclear power plants, the increased cost of capital, and the inability of utilities to attract capital investors, all add up to a need for an economical and reliable method and apparatus for reducing the demand at peak load intervals on electric utilities.

Approximately 33% of the total electric power generated in the United States is consumed in homes. Of the 69,000,000 homes served by electric utilities, approximately 20,000,000 use electric hot water heaters. These 20,000,000 homes consume an estimated 20% of the electrical power generated in homes. By far the largest consumer of electric power in homes which are not heated by electrical power is the electric water heater. These units when set at a temperature of 160° F, as is typical, account for a minimum of 20% and in many cases as much as 50% of power consumed. The power consumption of electric water heaters can be cut in half without any inconvenience to the consumer if the energization thereof is appropriately controlled, thereby reducing peak power requirements in the home from 10% to 25%.

It is therefore an object of this invention to provide a method and apparatus for reducing power demand on electrical utilities.

It is another object of this invention to provide a method and apparatus for reducing peak power demand on electrical utilities.

It is yet another object of this invention to provide a reliable and economical method and apparatus for reducing both power and peak power demands on electrical utilities.

SHORT STATEMENT OF THE INVENTION

Accordingly, this invention relates to a method and apparatus for cyclically controlling the energization of water heaters in residential homes on both a daily and seasonal basis. The apparatus includes a pair of clock timers each having a disk driven thereby for supporting a plurality of relay actuators in spaced relationship to one another. The relay actuators open and close relays associated with each clock timer whereby the relays control power flow from a suitable source of power to the water heater via a seasonal thermostatic switch. The season thermostatic switch connects one or the other of the relays in circuit with the water heater and the power source. On one of the disks the actuators are spaced for "summer" load condition so that power to the water heater is inhibited for a substantial portion of the time in each day when "summer" power demand is greatest. On the other disk the actuators are spaced for "winter" load conditions so that power to the water heater is inhibited for a substantial portion of the time during which "winter" power demand is greatest. Accordingly, during peak demand intervals which, of course, vary on a seasonal basis, electrical power to the water heater is cut off to thereby reduce the peak power demand on the electrical utility.

BRIEF DESCRIPTION OF THE DRAWING

Other objects, features and advantages of the present invention will become more fully understood from the following detailed description of the preferred embodiment, the appended claims and accompanying drawings, in which:

DETAILED DESCRIPTION OF THE PREFERRED EMBODIMENT

Throughout the detailed description of the preferred embodiment of the present invention like numerals will correspond to like elements in the figures.

Figure 1:
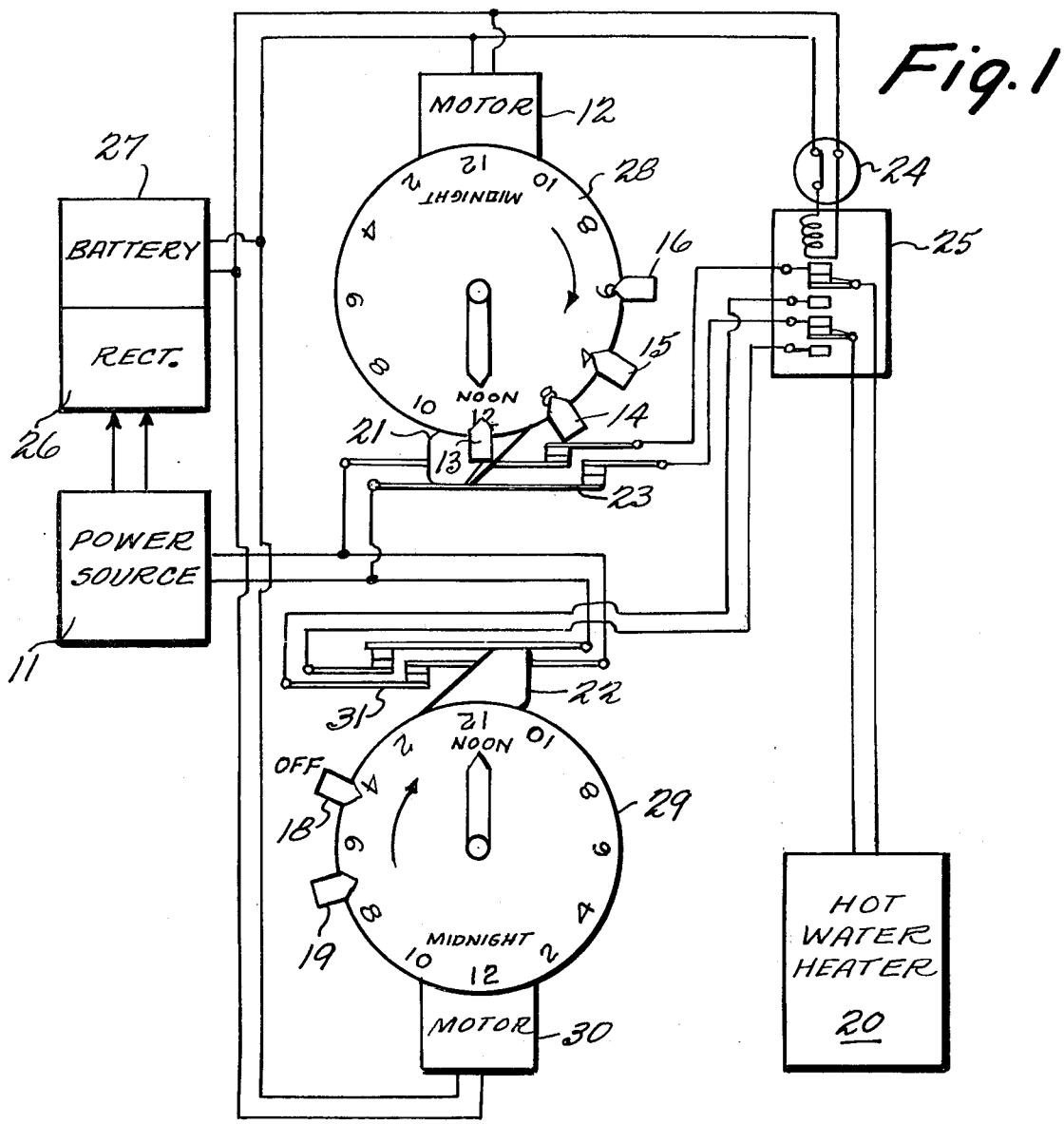
FIG. 1 is a schematic block diagram of the timer switch relays, the thermostatic switch and the timing sequence of a preferred embodiment of the present invention.

Refer now to FIG. 1 where there is disclosed a diagram of the preferred embodiment of the present invention for reducing peak power demand on electrical utilities. A power source 11 provides power in a 120/12 volt transformer and rectifier circuit 26. Transformer-rectifier circuit 26 supplies 12 volts d.c. to regulator and battery circuit 27. The regulator in the circuit 27 maintains the voltage output level at a constant 12 volts d.c. and in addition, provides charging current to the battery therein as required. The battery is for the purpose of supplying power should external power from source 11 be temporarily cut off. The output of the regulator in circuit 27 provides 12 volts d.c. to timer motors 12 and 30, to thermostatic switch 24 and to thermostatic relay 25. In addition, either 240 volts or 120 volts a.c. is supplied from power source 11 to timer relays 23 and 31.

In operation, the power from the regulator circuit 27 energizes the clock motors 12 and 30. Clock motor 30 rotates disk 28 on which are positioned a plurality of actuator cams 13–16. Clock motor 30 rotates disk 9 on which are mounted cams 18 and 19. These mechanical cams 13–16 and 18 and 19 sequentially engage double pole, single throw relays 23 and 31 via cams 21 and 22, respectively. The rotating disks 28 and 29 are calibrated in 24-hour units on the face thereof. For synchronization purposes, the rotating disks 28 and 29 can be lifted upward and outward from the respective clock motors to disengage them therefrom and then rotated to synchronize the disk with local standard time. The disk can then be reset into the respective clock motors to begin operation.

In the preferred embodiment, the clock motors 12 and 30 are each 24-hour continuous timers commercially available as Intermatic Timer Control, Model T-103. The clock motors on both timers are operated by 12 volts d.c., while the double pole, single throw switches 23 and 31 are rated at 40 amperes at 240 volts and are utilized in the primary electrical supply circuit to the hot water heaters. It should be understood that while a two-wire system is disclosed, if a third neutral wire is desired, such can be put in circuit in a conventional manner.

In the cyclic sequence of the preferred embodiment, on disk 28 which corresponds to the "summer" seasonal cycle, cam 30 is an OFF cam set to engage cam follower 21 at 12:00 noon, cam 14 is an ON cam set to engage the cam follower at 2:00 p.m., cam 15 is an OFF cam set to engage the cam follower at 4:00 p.m., and cam 16 is an ON cam set to engage the cam follower at 6:00 p.m. On disk 29 cam 18 is an OFF cam set to engage the cam follower 22 at 4:30 p.m., and cam 19 is an ON cam set to engage the cam follower 22 at 7:00 p.m. As illustrated, current from the power source 11 is coupled to the double pole, double throw relay 25 via double pole, single throw relays 23 and 31. The current is then coupled from relay 25 to the hot water heater 20.

In operation, as the clock motors 12 and 13 rotate disks 28 and 29, respectively, in synchronization with local time, the rotating disks 28 and 29 complete one revolution every 24 hours. As the rotating disks 28 and 29 rotate, the cam actuators 13–16 and 18 and 19 sequentially actuate the cam followers 21 and 22, respectively, at the preset times aforementioned. As the OFF cam 13 actuates the cam follower 21, the cam follower is rotated counterclockwise to open the double pole, single throw relay 23, thereby breaking the power circuit from the power source 11 to the relay 25. As the disk 28 further rotates, cam actuator 14 actuates cam follower 21 to rotate cam follower 21 clockwise, thereby closing relay 23. Accordingly, the circuit between power source 11 and relay 25 is made so that the hot water heater is capable of being energized. As the disk further rotates, cam actuator 15 actuates cam follower 21 to thereby again open relay 23 to disengage relay 25 from power source 11, thereby inhibiting the energization of the water heater 20. Finally, when cam actuator 16 rotates to actuate cam follower 21, the relay 23 is again closed, thereby permitting energization of the water heater 20.

The aforementioned cycle occurs during the "summer" load pattern and operates in the following manner. The position of the double pole, double throw relay 25 depends upon the temperature setting of the thermostat 24. The thermostat 24 is set at a predetermined temperature by the utility based upon the utility temperature load pattern. When the thermostatic switch 24 is closed, i.e., during the "summer" temperature load pattern, relay switch 25 closes the power circuit from relay 23 to the hot water circuit 20. When the thermostatic switch 24 is opened, relay 25 is switched to close the power circuit from relay 31 to the water heater 20. Hence, it can be seen from FIG. 1 that energization of the hot water heater by the power source 11 is inhibited during the period between 12:00 and 2:00 p.m. and 4:00 and 6:00 p.m. It is well known from statistical data that peak power loads in the summertime, due primarily to air conditioning, is during the period between 12:00 and 8:00 p.m. and accordingly, by the arrangement of the present inveniton, curent flow to hot water heaters is minimized during this peak demand interval.

Now assume that the thermostatic switch 24 has caused the relay to close onto the circuit of relay 31, thereby signifying that "winter" load demand characteristics are being experienced by the power company. During this time or season, OFF cam actuator 18 actuates cam 22 to open relay 31 to thereby inhibit power flow to the water heater 20. As the disk 29 continues to rotate, ON cam actuator 19 actuates the cam follower 22 to thereby again close the relay 31 to permit energization of the hot water heater 20. It accordingly can be seen that during the "winter" load demand cycle, power flow to the hot water heater is inhibited between the hours of 4:00 or 4:30 and 7:00 p.m. which, as is well known, is in the peak power demand portion of the "winter" power cycle.

Figure 2:
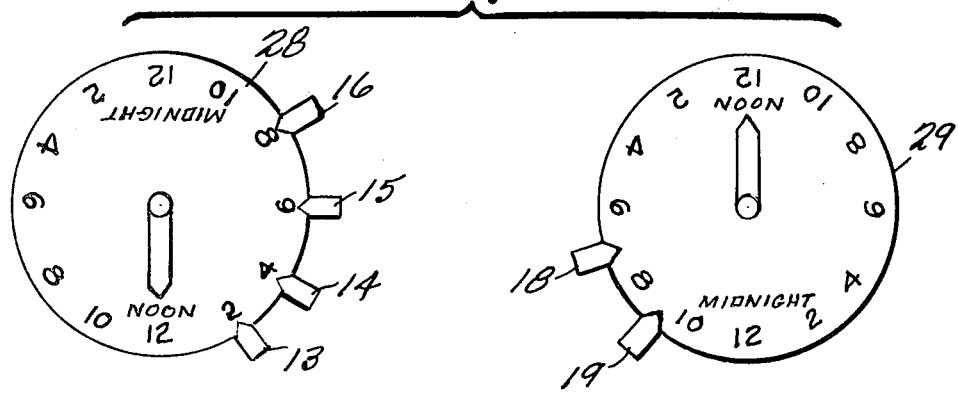
FIG. 2 is a schematic diagram of an alternate timing sequence of the present invention.

Refer now to FIG. 2 where there is disclosed in schematic form an alternate setting of the cam actuators 13–16 for the disk 28 and cams 18 and 19 for the disk 29. It can be seen from examination of FIG. 2 that during the "summer" load demand cycle, power to the hot water heater 20 is cut off between 2:00 and 4:00 p.m. and 6:00 and 8:00 p.m. In addition, during the winter demand cycle, power to the hot water heater 20 is cut off between 7:00 and 9:30. It accordingly can be seen that if the cyclic controls of the present invention are positioned in homes on a mass scale with half of the controls having the timing sequence of FIG. 1 and half having the timing sequence of FIG. 2 that the reduction in peak power demand due to hot water heaters will be substantially reduced during the periods between 12:00 noon and 8:00 p.m. during the summer demand cycle and between the hours of 4:30 p.m. and 9:30 p.m. during the "winter" demand cycle. The resulting savings to utilities can be substantial because of the disproportionately greater cost of peak demand electrical energy over normal or base load electrical energy. It should be understood that the cycles illustrated in FIGS. 1 and 2 are established as a result of nationwide composite load patterns and may be varied as desired depending on the demand cycles in given localities. It should also be understood that the "summer" and "winter" cycles referred to hereinabove are determined by the temperature versus load pattern of each utility and while the change in load cycle generally corresponds to the summer and winter seasons, the cycles are more closely related to changes in temperature in given localities.

While the preferred embodiment of applicants' invention has been disclosed, it should be appreciated that there may be other alternative embodiments of applicants' invention which fall within the spirit and scope of the invention as defined by the appended claims.

What is claimed is:
1. An apparatus for cyclically controlling the energization of water heaters on a daily and seasonal demand cycle basis, said apparatus comprising:
    at least one clock timer,
    means for continuously driving said clock timer,
    a first relay for controlling the energization of said water heater,
    a first plurality of actuator means for energizing said relay, alternate ones of said actuators opening said relay to inhibit energization of said water heater,
    means responsive to said clock timer for continuously and cyclically moving said actuator means into engagement with said relay, said actuators being spaced with respect to one another to prevent energization of said water heater during a substantial portion of the peak power demand interval during a summmer load demand cycle,
    a second relay for controlling the energization of said water heater,
    a second plurality of actuator means for energizing said second relay, alternate ones of said actuators opening said second relay to inhibit energization of said water heater,
    means responsive to said clock timer for continuously and cyclically moving said second plurality of actuator means into engagement with said second relay, said second actuator means being spaced with respect to one another to prevent energization of said water heater during a substantial portion of the peak demand interval during a winter load demand cycle, and
    means for selectively coupling at least one of said first and second relays to said water heater, depending on whether a summer or winter load demand cycle, respectively, exists.
2. The apparatus of claim 1 wherein said selective coupling means further comprises:
    a thermostatic switch, and
    a relay responsive to said thermostatic switch for coupling said first relay to said hot water heater when said thermostatic switch detects a summer load demand cycle, and for coupling said second relay to said hot water heater when said thermostatic switch detects a winter load demand cycle.
3. The apparatus of claim 2 wherein
    said means for continuously driving said clock timer comprises
    means for converting an input AC voltage to a regulated DC voltage,
    means coupling said voltage to said at least one clock timer, and
    electrical energy storage means for providing a DC voltage during a discontinuity in the output of said regulated DC voltage.
4. In a hot water system having a relay arrangement for selectively inhibiting the energization thereof, a method of controlling the energization of water heaters on a daily and seasonal demand cycle basis comprising the steps of
    continuously energizing at least one clock timer,
    selectively spacing a first plurality of relay actuators with respect to one another, each of said spacings corresponding to predetermined periods of time,
    continuously and cyclically moving said first relay actuators at a uniform rate in response to said clock times, said actuators cyclically engaging a first relay with alternate ones of said actuators closing said first relay to permit energization of said water heater, said actuators being spaced to permit energization of said water heater during periods of high electricity demand during a summer load demand cycle,
    selectively spacing a second plurality of relay actuators with respect to one another, each of said spacings corresponding to predetermined periods of time,
    continuously and cyclically moving said second relay actuators at a uniform rate in response to said clock timer, said second actuators cyclically engaging a second relay with alternate ones of said actuators closing said second relay to permit energization of said water heater, said second actuators being spaced to permit energization of said water heater during periods of high electrical demand during a winter load demand cycle,
    detecting whether a summer or winter load demand cycle exists, and
    connecting at least one of said first and second relays to said hot water heating depending on whether a summer or winter load demand cycle exists.
5. The method of claim 4 wherein said continuously energizing said at least one clock timer step comprises the steps of
    converting an input AC voltage to a regulated DC voltage,
    coupling said voltage to said at least one clock timer,
    storing electrical energy in a battery, and
    coupling said stored voltage to said at least one clock timer during discontinuities in said regulated DC voltage.
6. The method of claim 5 wherein said detecting step comprises the step of detecting when the ambient temperature is above or below a preselected temperature, a temperature above a level corresponding to a summer load demand cycle and a temperature below said level corresponding to a summer load demand cycle.

* * * * *